US012735288B2

(12) United States Patent
Kurita et al.

(10) Patent No.: US 12,735,288 B2
(45) Date of Patent: Sep. 15, 2026

(54) INTERMEDIATE TRANSPORT DEVICE AND MEDIUM PROCESSING SYSTEM

(71) Applicant: FUJIFILM Business Innovation Corp., Tokyo (JP)

(72) Inventors: Tomokazu Kurita, Kanagawa (JP); Teisuke Yanagawa, Kanagawa (JP); Katsumi Tanaka, Kanagawa (JP); Raita Doi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 490 days.

(21) Appl. No.: 18/172,046

(22) Filed: Feb. 21, 2023

(65) Prior Publication Data

US 2024/0051313 A1 Feb. 15, 2024

(30) Foreign Application Priority Data

Aug. 15, 2022 (JP) ................................ 2022-129226

(51) Int. Cl.
*B65H 29/60* (2006.01)
*B41J 13/00* (2006.01)
(Continued)

(52) U.S. Cl.
CPC ............ *B65H 29/60* (2013.01); *B41J 13/009* (2013.01); *B41J 13/106* (2013.01);
(Continued)

(58) Field of Classification Search
CPC ...... B65H 29/125; B65H 29/58; B65H 29/60; B65H 2301/33216; B65H 2301/33222;
(Continued)

(56) References Cited

U.S. PATENT DOCUMENTS 4,879,571 A * 11/1989 Plasscheart .......... G03G 15/238 355/24
9,623,684 B2 4/2017 Herrmann
(Continued)

FOREIGN PATENT DOCUMENTS

JP 2004091152 A 3/2004
JP 2006347634 A * 12/2006 ............ B65H 29/60
(Continued)

OTHER PUBLICATIONS

May 12, 2026 Office Action issued in Japanese Patent Application No. 2022-129225.
(Continued)

*Primary Examiner* — Prasad V Gokhale
(74) *Attorney, Agent, or Firm* — Oliff PLC

(57) ABSTRACT

An intermediate transport device includes: a changing unit that changes a direction of a recording medium received from a pre-processing device to at least one of one direction and another direction with respect to a receiving direction in which the recording medium is received, and delivers the recording medium; and a housing that has a delivery port through which the recording medium delivered to the one direction toward one post-processing device passes, and another delivery port through which the recording medium delivered to the other direction toward another post-processing device passes, and that is disposed at a height similar to a height of the delivery port.

20 Claims, 12 Drawing Sheets

(51) Int. Cl.
*B41J 13/10* (2006.01)
*B65H 29/12* (2006.01)

(52) U.S. Cl.
CPC . *B65H 29/125* (2013.01); *B65H 2301/33216* (2013.01); *B65H 2301/33222* (2013.01); *B65H 2301/3411* (2013.01); *B65H 2301/4474* (2013.01); *B65H 2402/10* (2013.01); *B65H 2402/442* (2013.01); *B65H 2402/443* (2013.01); *B65H 2404/14212* (2013.01); *B65H 2801/27* (2013.01)

(58) Field of Classification Search
CPC .......... B65H 2301/34; B65H 2301/341; B65H 2301/3411; B65H 2301/4474; B65H 2402/10; B65H 2402/442; B65H 2402/443; B65H 2404/142; B65H 2404/1421; B65H 2404/14212; B65H 2404/152; B65H 2404/1521; B65H 2404/15212; B65H 2801/27; B41J 13/009; B41J 13/106
USPC .......................................................... 271/225
See application file for complete search history.

(56) References Cited

U.S. PATENT DOCUMENTS

| | | | | |
|---|---|---|---|---|
| 2016/0347088 | A1* | 12/2016 | Herrmann | B41J 13/009 |
| 2017/0087819 | A1* | 3/2017 | Hoffman | B65G 47/244 |
| 2017/0313537 | A1* | 11/2017 | Herrmann | G06K 15/022 |

FOREIGN PATENT DOCUMENTS

| | | | |
|---|---|---|---|
| JP | 2008030894 | A | 2/2008 |
| JP | 2016-222461 | A | 12/2016 |

OTHER PUBLICATIONS

May 12, 2026 Office Action issued in Japanese Patent Application No. 2022-129226.

* cited by examiner

INTERMEDIATE TRANSPORT DEVICE AND MEDIUM PROCESSING SYSTEM

CROSS-REFERENCE TO RELATED APPLICATIONS

This application is based on and claims priority under 35 USC 119 from Japanese Patent Application No. 2022-129225 filed Aug. 15, 2022 and Japanese Patent Application No. 2022-129226 filed Aug. 15, 2022.

BACKGROUND

(i) Technical Field

The present disclosure relates to an intermediate transport device and a medium processing system.

(ii) Related Art

Japanese Unexamined Patent Application Publication No. 2016-222461 discloses a medium sheet router that receives a medium sheet, guides the medium sheet to a spiral path, and discharges the medium.

SUMMARY

There is an intermediate transport device that receives a recording medium from a pre-processing device such as an image forming device and delivers the received recording medium to a post-processing device. When there are multiple post-processing devices that each receive a recording medium directly from the intermediate transport device, the intermediate transport device is required to change the delivery direction of the received recording medium.

In an intermediate transport device of the related art, a height at which each recording medium is delivered to one post-processing device with the direction of the recording medium changed differs from a height at which the recording medium is delivered to another post-processing device with the direction of the recording medium changed. In other words, a height of a delivery port through which each recording medium passes when the recording medium is to be delivered to one post-processing device differs from a height of a delivery port through which each recording medium passes when the recording medium is to be delivered to another post-processing device. Therefore, the one post-processing device and the other post-processing device are adjusted to different heights, which complicates management of height adjustment of the post-processing devices.

One of objects of non-limiting embodiments of the present disclosure is to simplify the management of height adjustment of post-processing devices in a configuration in which recording media are each delivered to a corresponding one of multiple post-processing devices with the directions of the recording media changed, compared with a case where a height of a delivery port through which each recording medium passes when the recording medium is to be delivered to one post-processing device differs from a height of a delivery port through which each recording medium passes when the recording medium is to be delivered to another post-processing device.

Meanwhile, each recording medium pre-processed by a pre-processing device is delivered to a post-processing device, and post-processed by the post-processing device. In the related art, a post-processing device receives each recording medium delivered from one pre-processing device, and post-processes the received recording medium.

One of objects of non-limiting embodiments of the present disclosure is to receive recording media from multiple pre-processing devices and deliver the received recording media to a common post-processing device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an intermediate transport device comprising: a changing unit that changes a direction of a recording medium received from a pre-processing device to at least one of one direction and another direction with respect to a receiving direction in which the recording medium is received, and delivers the recording medium; and a housing that has a delivery port through which the recording medium delivered to the one direction toward one post-processing device passes, and another delivery port through which the recording medium delivered to the other direction toward another post-processing device passes, and that is disposed at a height similar to a height of the delivery port.

BRIEF DESCRIPTION OF THE DRAWINGS

Exemplary embodiments of the present disclosure will be described in detail based on the following figures, wherein.

DETAILED DESCRIPTION

Figure 1:
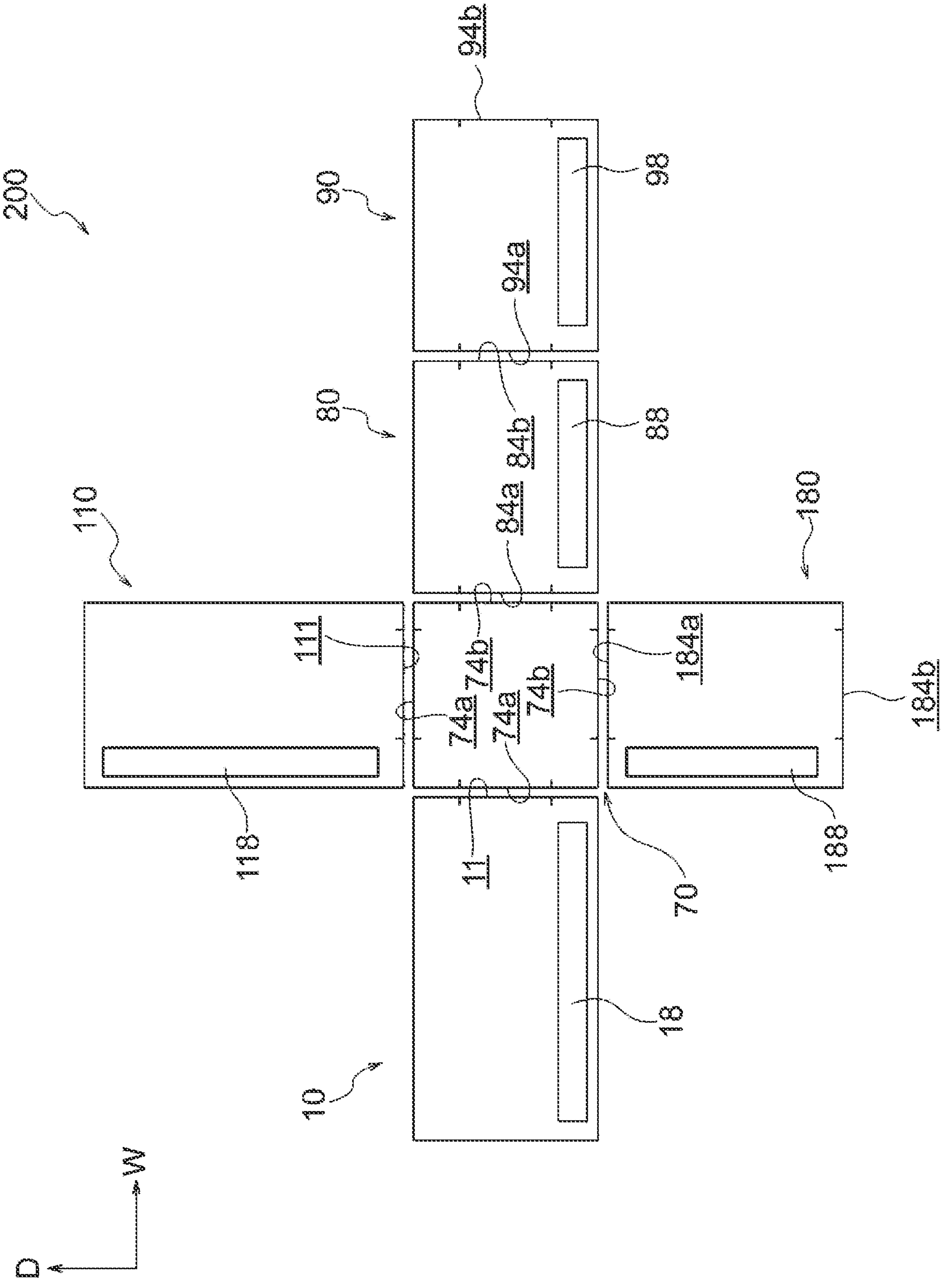
FIG. 1 is a plan view illustrating a medium processing system according to an exemplary embodiment of the present disclosure.

Examples of an intermediate transport device and a medium processing system including the intermediate transport device according to an exemplary embodiment of the present disclosure will be described with reference to FIG. 1 to FIG. 12. In the drawings, the arrow H indicates the up-down direction, which is the vertical direction, the arrow W indicates the width direction, which is the horizontal direction, and the arrow D indicates the depth direction, which is the horizontal direction. The arrow H, the arrow W, and the arrow D are orthogonal to each other.

As illustrated in FIG. 1, a medium processing system 200 includes an image forming device 10 having a color mode, an image forming device 110 having only a monochrome mode, an intermediate transport device 70, a cutting machine 80, a bookbinding machine 90, and a folding machine 180. The image forming device 10 and the image forming device 110 are examples of a pre-processing device, and the cutting machine 80 and the bookbinding machine 90 are examples of one post-processing device, and the folding machine 180 is an example of another post-processing device. Alternatively, the image forming device 10 and the image forming device 110 are examples of a pre-processing device, and the cutting machine 80, the bookbinding machine 90, and the folding machine 180 are examples of a post-processing device.

The image forming device 10 is disposed such that an operation screen 18 of the image forming device 10 is on the near side in the depth direction. The intermediate transport device 70 is disposed on one side in the width direction with respect to the image forming device 10.

The image forming device 110 is disposed on the far side in the depth direction with respect to the intermediate transport device 70 and such that an operation screen 118 of the image forming device 110 is on the other side in the width direction. The folding machine 180 is disposed on the near side in the depth direction with respect to the intermediate transport device 70 and such that an operation screen 188 of the folding machine 180 is on the other side in the width direction.

The cutting machine 80 is disposed on the one side in the width direction with respect to the intermediate transport device 70 and such that an operation screen 88 of the cutting machine 80 is on the near side in the depth direction. The bookbinding machine 90 is disposed on the one side in the width direction with respect to the cutting machine 80 and such that an operation screen 98 of the bookbinding machine 90 is on the near side in the depth direction.

Image Forming Device 10

Figure 2:
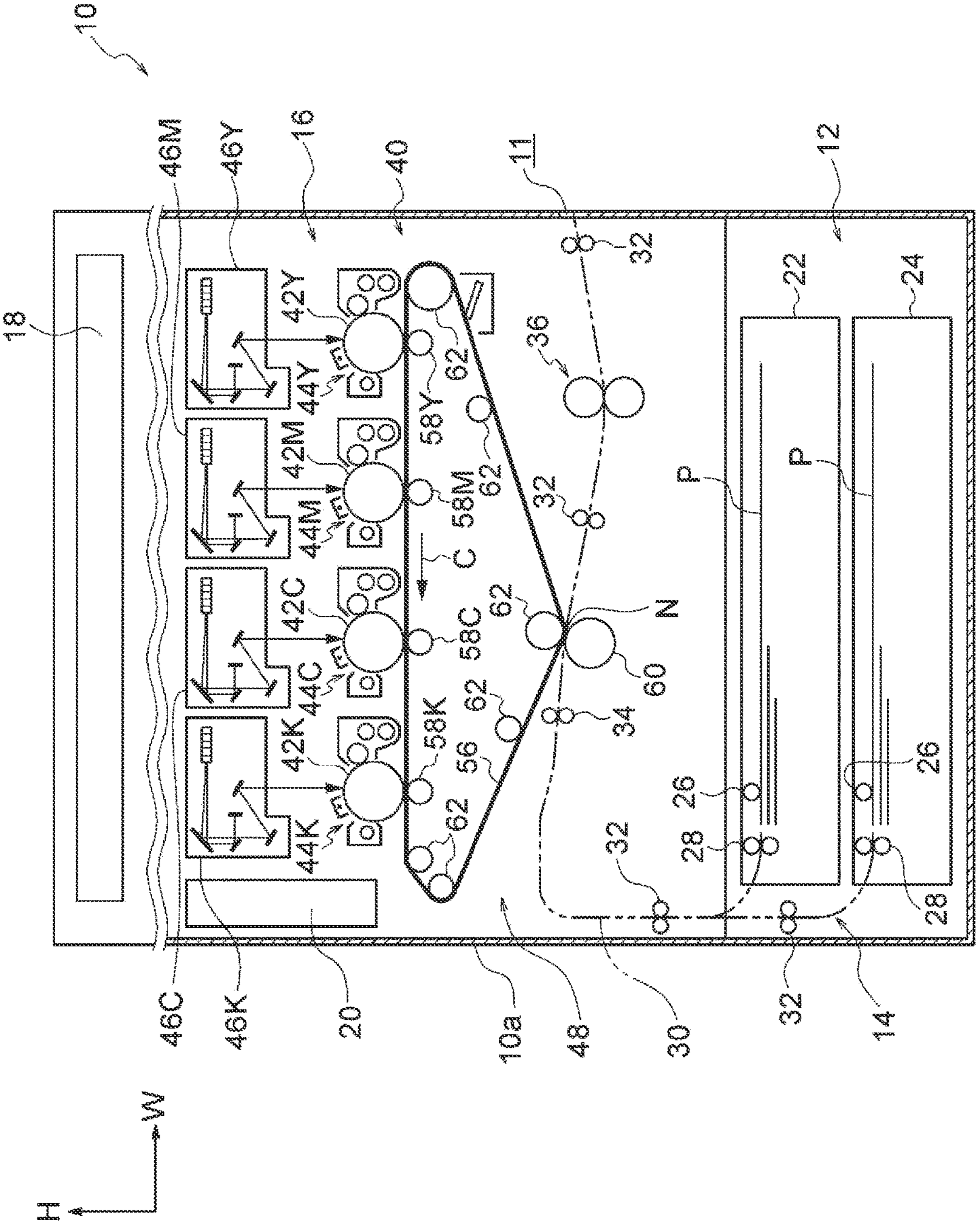
FIG. 2 schematically illustrates a configuration of an image forming device having a color mode and included in a medium processing system according to an exemplary embodiment of the present disclosure.

FIG. 2 schematically illustrates the image forming device 10 as viewed from the operation side of the image forming device 10. In other words, FIG. 2 schematically illustrates the image forming device 10 as viewed from the side of the operation screen 18 of the image forming device 10.

As illustrated in FIG. 2, the image forming device 10 includes a sheet storage portion 12 that stores sheet members P as an example of a recording medium; a transport portion 14 that transports the sheet members P; and an operation portion 16 that forms images on the transported sheet member P. The image forming device 10 further includes the operation screen 18 that is to be operated by a user, and a controller 20 that controls each portion.

Sheet Storage Portion 12, Transport Portion 14

As illustrated in FIG. 2, the sheet storage portion 12 includes a first storage 22 and a second storage 24 that are capable of storing sheet members P of different sizes. The first storage 22 and the second storage 24 each provided with a delivery roller 26 that delivers stored sheet members P one by one, and a transport roller 28 that transports the delivered sheet members P to a transport path 30 provided in the inside of a housing 10*a*.

The transport portion 14 includes multiple transport rollers 32 that transport each sheet member P delivered to the transport path 30; and a registration roller 34 that stops the sheet member P temporarily and delivers the sheet member P at a predetermined timing to a second-transfer location N, which is described later, to thereby perform registration of image transfer. Consequently, the transport portion 14 is configured to deliver each sheet member P to the outside of the housing 10*a* through a delivery port 11 formed on the one side in the width direction when viewed from the operation side of the image forming device 10.

Operation Portion 16

As illustrated in FIG. 2, the operation portion 16 includes an image forming portion 40 that forms a toner image (developer image), and a fixing device 36 that fixes the toner image on each sheet member P.

Image Forming Portion 40

The image forming portion 40 includes image forming units 44K, 44C, 44M, and 44Y respectively including image carriers 42K, 42C, 42M, and 42Y corresponding to yellow (Y) tonner, magenta (M) tonner, cyan (C) tonner, and black (K) tonner, respectively; exposing devices 46K, 46C, 46M, and 46Y that each form an electrostatic latent image by radiating exposure light L toward the outer peripheral surface of a corresponding one of the image carriers 42K, 42C, 42M, and 42Y that have been charged; and a transfer unit 48 that transfers images formed by image forming units 44K, 44C, 44M, and 44Y to a sheet member P.

In the rotation direction (see the arrow C in FIG. 2) of a transfer belt 56 included in the transfer unit 48, the image forming units 44 of yellow (Y), magenta (M), cyan (C), and black (K) are disposed side by side in this order from the upstream side.

The image forming units 44K, 44C, 44M, and 44Y are configured similarly except for the color of toner to be used. The signs Y, M, C, and K may be omitted when distinction among Y, M, C, and K is unnecessary.

Figure 3:
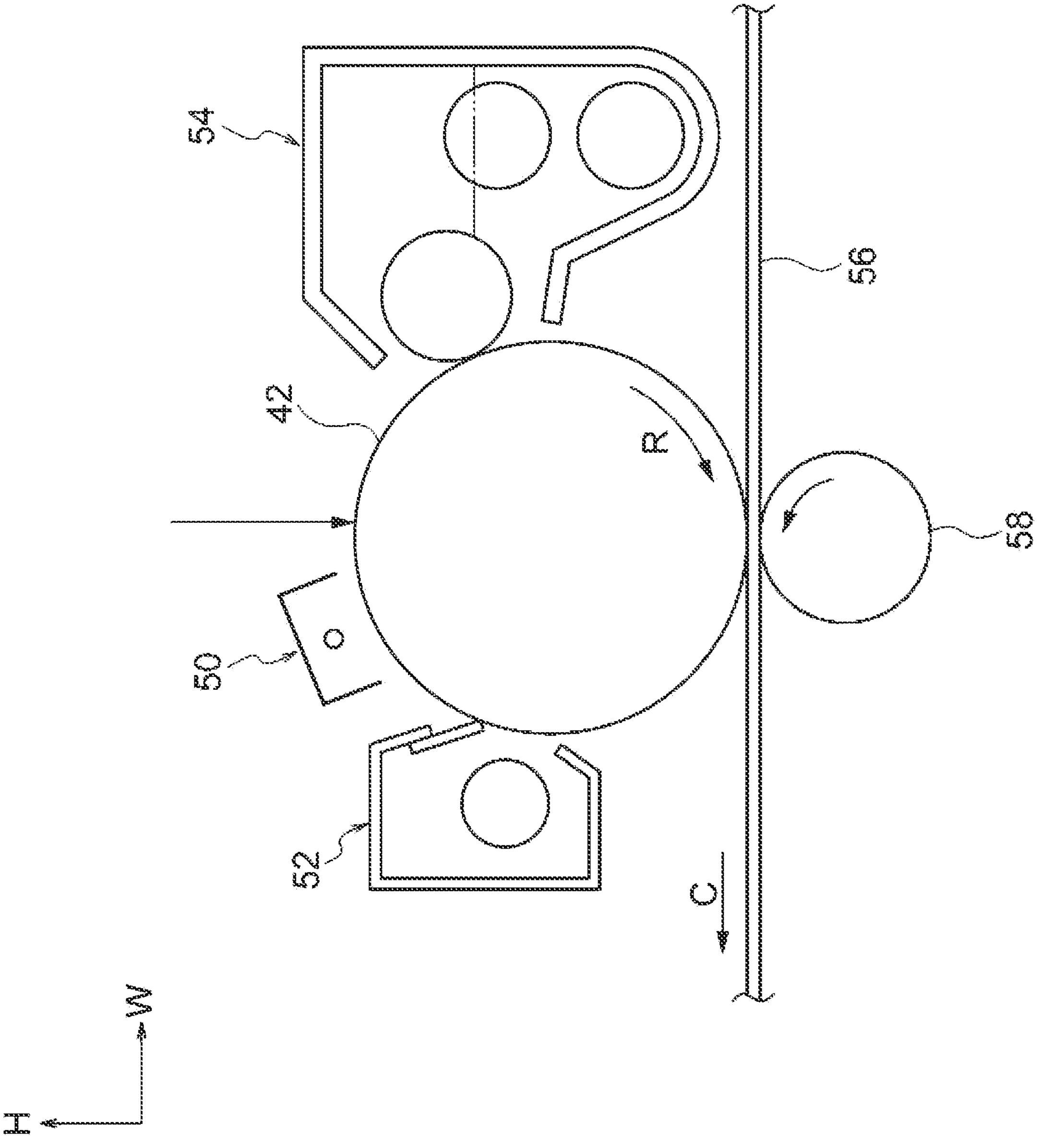
FIG. 3 schematic illustrates a configuration of an image forming unit of an image forming device having a color mode and included in a medium processing system according to an exemplary embodiment of the present disclosure.

As illustrated in FIG. 3, each image forming unit 44 includes the image carrier 42 that rotates in the arrow R direction in FIG. 3; a charging device 50 that charges the outer peripheral surface of the image carrier 42; a cleaning unit 52; and a developing device 54 that develops an electrostatic latent image formed by the exposing device 46 (refer to FIG. 2) into a toner image.

As illustrated in FIG. 2, the transfer unit 48 includes the transfer belt 56 that is disposed below the image forming units 44 and in contact at the outer peripheral surface thereof with the image carriers 42 for respective colors; first-transfer rollers 58 that are disposed opposite the image carriers 42 with the transfer belt 56 interposed therebetween and that transfer toner images formed on the image carriers 42 to the transfer belt 56; a second-transfer roller 60 that transfers the toner images transferred on the transfer belt 56 to a sheet member P; and multiple winding rollers 62.

Specifically, the transfer belt 56 is wound around the multiple winding rollers 62 into a triangular shape whose apex is directed downward, and is configured to rotate in the arrow C direction. The second-transfer roller 60 is disposed opposite the winding roller 62 that is disposed at the apex of the triangular shape, with the transfer belt 56 interposed therebetween. The second-transfer location N is a portion at which the transfer belt 56 and the second-transfer roller 60 are in contact with each other.

Fixing Device 36

The fixing device 36 is disposed on the downstream side of the second-transfer roller 60 in the transport direction of each sheet member P and is configured to fix, by heat and pressure, toner images that have been transferred on the sheet member P to the sheet member P.

In this configuration, the charging device 50 illustrated in FIG. 3 charges the outer peripheral surface of the image carrier 42 that rotates. Further, the exposing devices 46 (refer to FIG. 2) form electrostatic latent images on the outer peripheral surfaces of the image carriers 42 by radiating exposure light with respect to respective image carriers 42. In addition, the developing devices 54 develop the electrostatic latent images on the image carriers 42 into toner images. Further, the first-transfer rollers 58 transfer the toner images on the image carriers 42 to the transfer belt 56.

The toner images of respective colors transferred on the transfer belt 56 are transported by the transfer belt 56 that rotates, and the second-transfer roller 60 illustrated in FIG. 2 transfers the toner images on the transfer belt 56 to a transported sheet member P. Further, the fixing device 36 fixes the toner images transferred on the transported sheet member P to the sheet member P. Then, the image forming device 10 delivers the sheet member P, to which the toner images have been fixed, to the outside of the housing 10*a* through the delivery port 11 formed in the housing 10*a*. Specifically, the image forming device 10 delivers the sheet member P to the outside from the right side, which is the one side in the width direction, when the image forming device 10 is viewed from the operation side.

Image Forming Device 110

Figure 4:
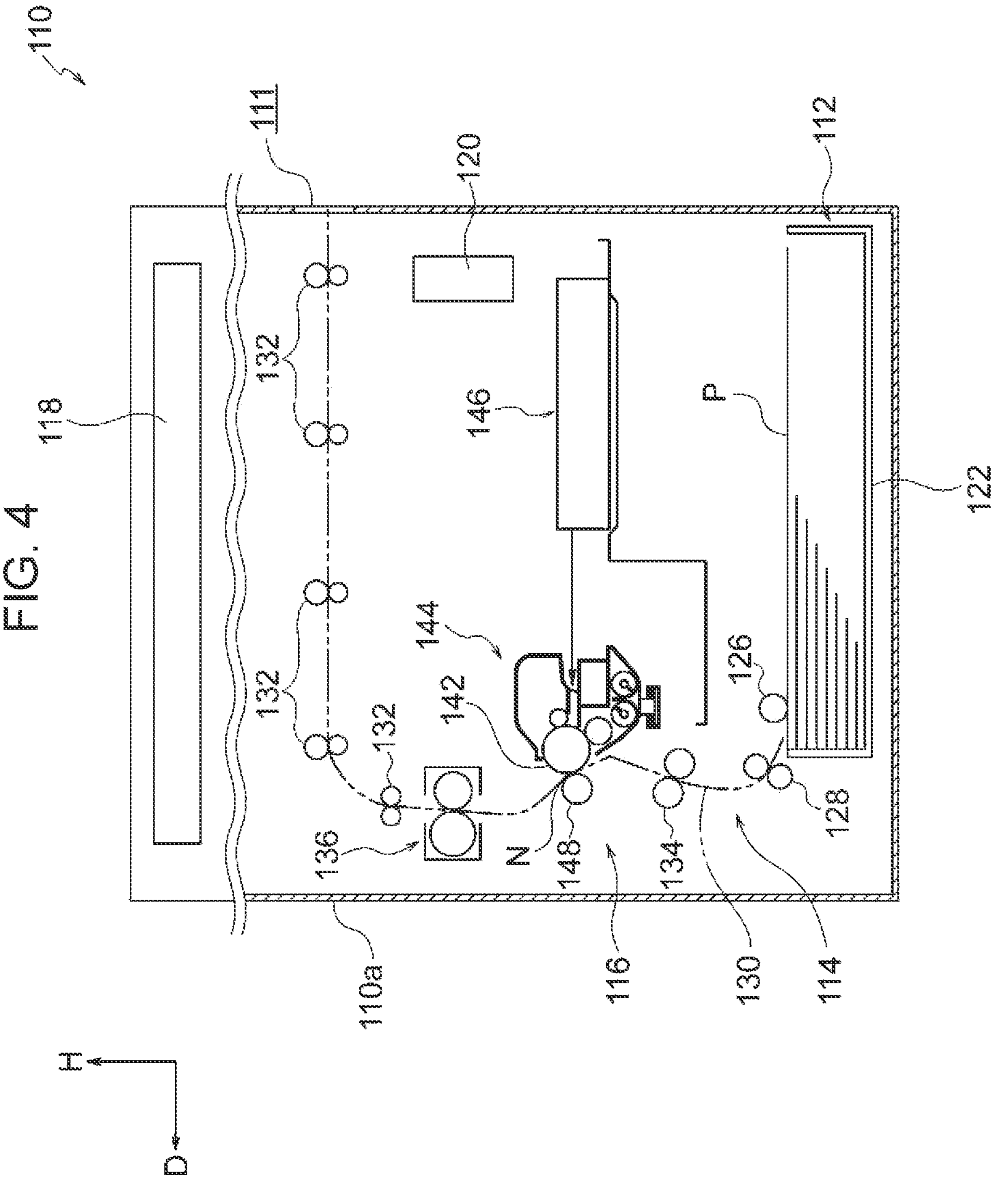
FIG. 4 schematically illustrates a configuration of an image forming device having only a monochrome mode and included in a medium processing system according to an exemplary embodiment of the present disclosure.

FIG. 4 schematically illustrates the image forming device 110 as viewed from the operation side of the image forming device 110. In other words, FIG. 4 schematically illustrates the image forming device 110 as viewed from the side of the operation screen 118 of the image forming device 110.

As illustrated in FIG. 4, the image forming device 110 includes a sheet storage portion 112 that stores sheet members P; a transport portion 114 that transports the sheet members P; and an image forming portion 116 that forms images on the transported sheet member P. The image forming device 110 further includes the operation screen 118 that is to be operated by a user, and a controller 120 that controls each portion.

Sheet Storage Portion 112, Transport Portion 114

As illustrated in FIG. 4, the sheet storage portion 112 includes a storage 122 capable of storing sheet members P. The storage 122 is provided with a delivery roller 126 that delivers the stored sheet members P one by one, and a transport roller 128 that transports the delivered sheet members P to a transport path 130 provided in the inside of a housing 110*a*.

The transport portion 114 includes multiple transport rollers 132 that transport the sheet members P delivered to the transport path 130; and a registration roller 134 that stops the sheet members P temporarily and delivers the sheet members P at a predetermined timing to the second-transfer location N, which is described later, to thereby perform registration of image transfer.

Image Forming Portion 116

As illustrated in FIG. 4, the image forming portion 116 includes an image forming unit 144 including an image carrier 142 corresponding to black (K) toner; an exposing device 146 that forms an electrostatic latent image by radiating exposure light L toward the outer peripheral surface of the image carrier 142 that has been charged; and a transfer roller 148 that transfers an image formed by the image forming unit 144 to a sheet member P. The image forming portion 116 further includes a fixing device 136 that fixes a toner image on the sheet member P.

Figure 5:
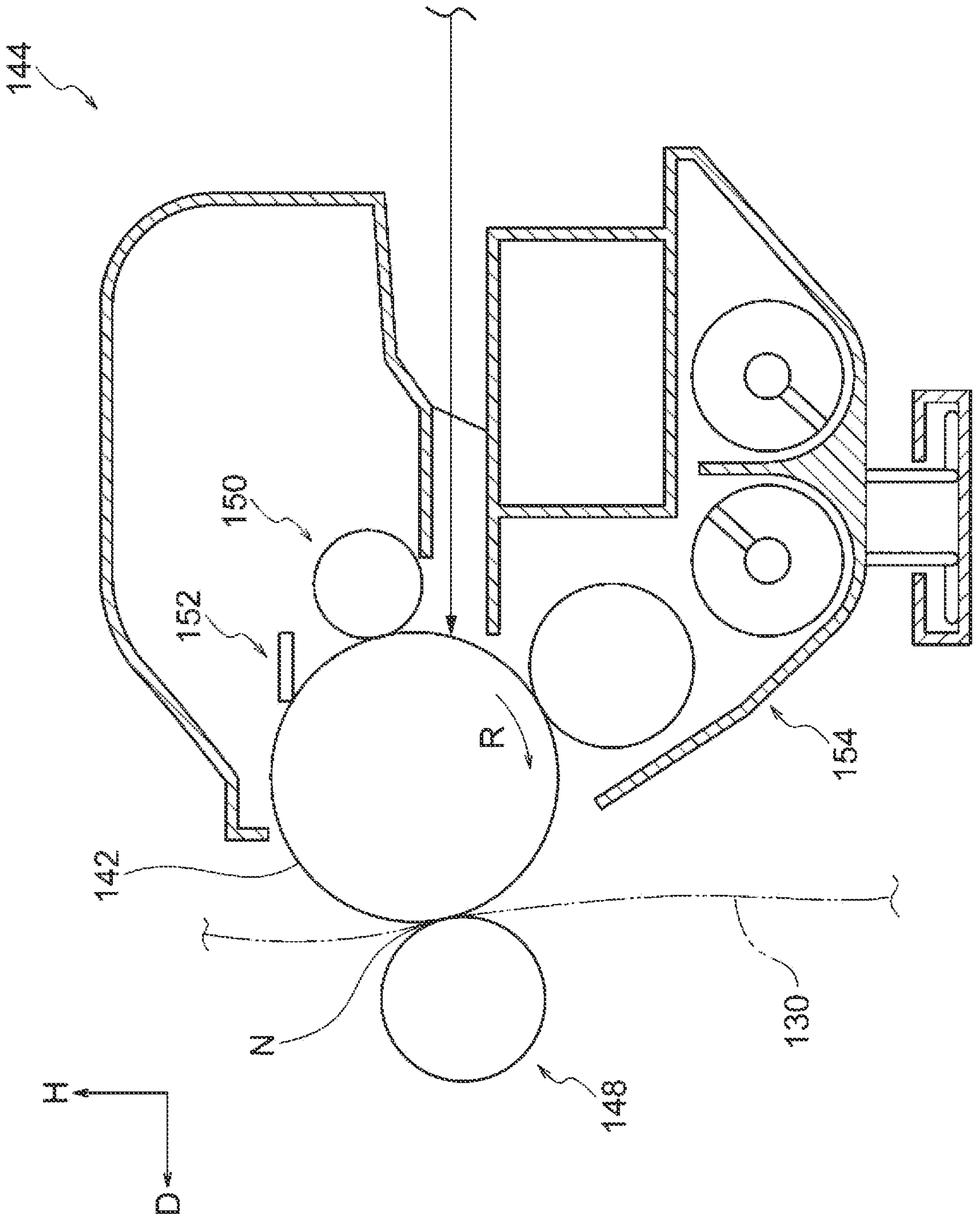
FIG. 5 schematically illustrates a configuration of an image forming unit of an image forming device having only a monochrome mode and included in a medium processing system according to an exemplary embodiment of the present disclosure.

As illustrated in FIG. 5, the image forming unit 144 includes the image carrier 142 that rotates in the arrow R direction in FIG. 5; a charging device 150 that charges the outer peripheral surface of the image carrier 142; a cleaning blade 152; and a developing device 154 that develops an electrostatic latent image formed by the exposing device 146 (refer to FIG. 4) into a toner image. The transfer roller 148 is disposed opposite the image carrier 142 with the transport path 130 interposed therebetween.

As illustrated in FIG. 4, the fixing device 136 is disposed on the downstream side of the transfer roller 148 in the transport direction of each sheet member P and is configured to fix, by heat and pressure, a toner image that has been transferred on the sheet member P to the sheet member P.

In this configuration, the charging device 150 illustrated in FIG. 5 charges the outer peripheral surface of the image carrier 142 that rotates. Further, the exposing device 146 (refer to FIG. 4) forms an electrostatic latent image on the outer peripheral surface of the image carrier 142 by radiating exposure light with respect to the image carrier 142. The developing device 154 develops the electrostatic latent image on the image carrier 142 into a toner image.

Further, the transfer roller 148 illustrated in FIG. 4 transfers the toner image on the image carrier 142 to a transported sheet member P. In addition, the fixing device 136 fixes the toner image that has been transferred on the transported sheet member P to the sheet member P. Then, the image forming device 110 delivers the sheet member P, to which the toner image is fixed, to the outside of the housing 110*a* through a delivery port 111 formed in the housing 110*a*. Specifically, the image forming device 110 delivers the sheet member P to the outside from the right side, which is the near side in the depth direction, when the image forming device 110 is viewed from the operation side of the image forming device 110.

Here, a height of the delivery port 111 from a floor surface at which the image forming device 110 is installed is similar to a height of the delivery port 11 of the image forming device 10.

Folding Machine 180

Figure 6:
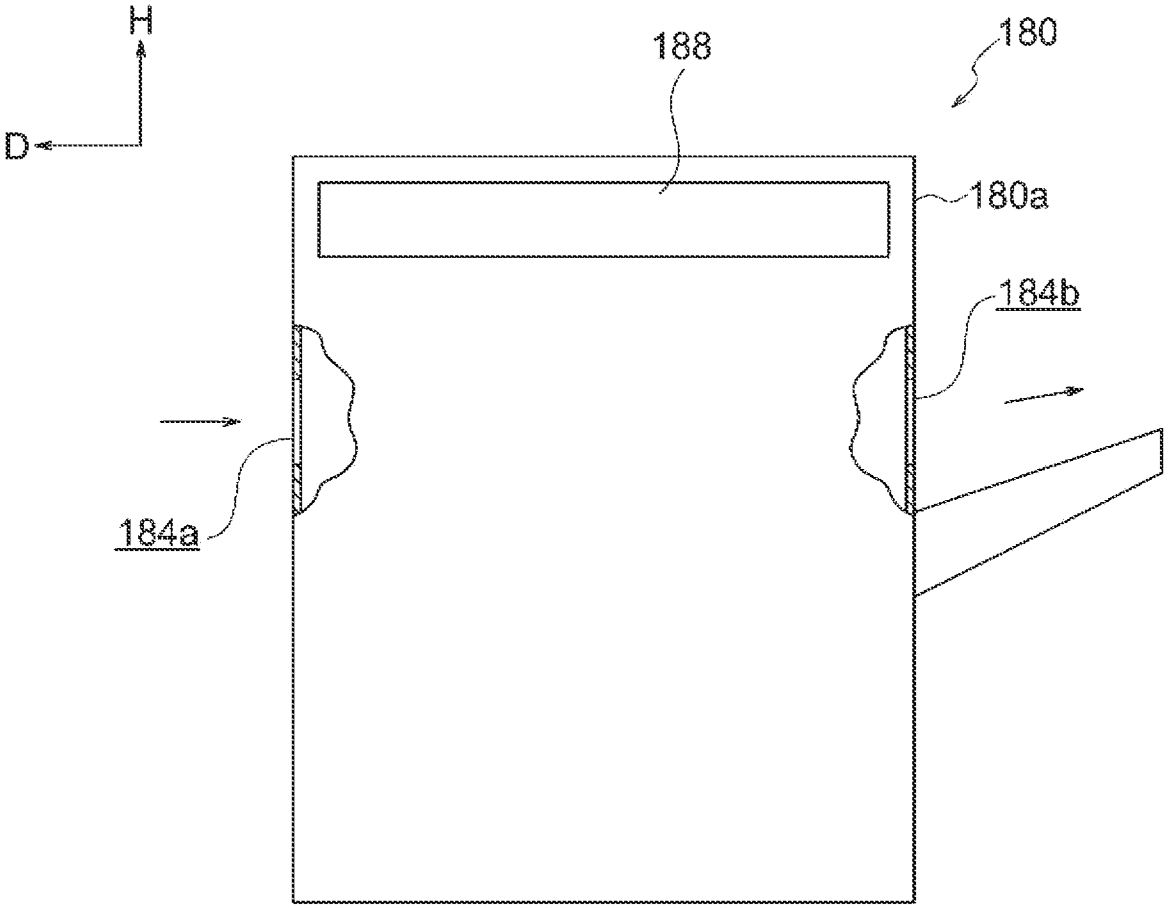
FIG. 6 is an external view illustrating an appearance of a folding machine included in a medium processing system according to an exemplary embodiment of the present disclosure.

FIG. 6 schematically illustrates the folding machine 180 as viewed from the operation side of the folding machine 180. In other words, FIG. 6 schematically illustrates the folding machine 180 as viewed from the side of the operation screen 188 of the folding machine 180.

The folding machine 180 is a known folding machine and is configured to receive each sheet member P and perform predetermined folding processing on the received sheet member P.

As illustrated in FIG. 6, a housing 180*a* of the folding machine 180 has a reception port 184*a* through which each sheet member P is received, and a delivery port 184*b* through which each sheet member P subjected to the folding processing is delivered. Specifically, when viewed from the operation side of the folding machine 180, the reception port 184*a* is formed on the far side in the depth direction and the delivery port 184*b* is formed on the near side in the depth direction. In other words, when viewed from the operation side of the folding machine 180, the reception port 184*a* is formed on the left side and the delivery port 184*b* is formed on the right side.

A height of the reception port 184*a* from a floor surface at which the folding machine 180 is installed is similar to a height of the delivery port 11 of the image forming device 10.

In this configuration, as illustrated in FIG. 6, the folding machine 180 receives each sheet member P from the far side in the depth direction and delivers the sheet member P subjected to the folding processing to the near side in the depth direction when viewed from the operation side of the folding machine 180. In other words, the folding machine 180 receives each sheet member P from the left side and delivers the sheet member P subjected to the folding processing to the right side when viewed from the operation side of the folding machine 180.

Cutting Machine 80

Figure 7:
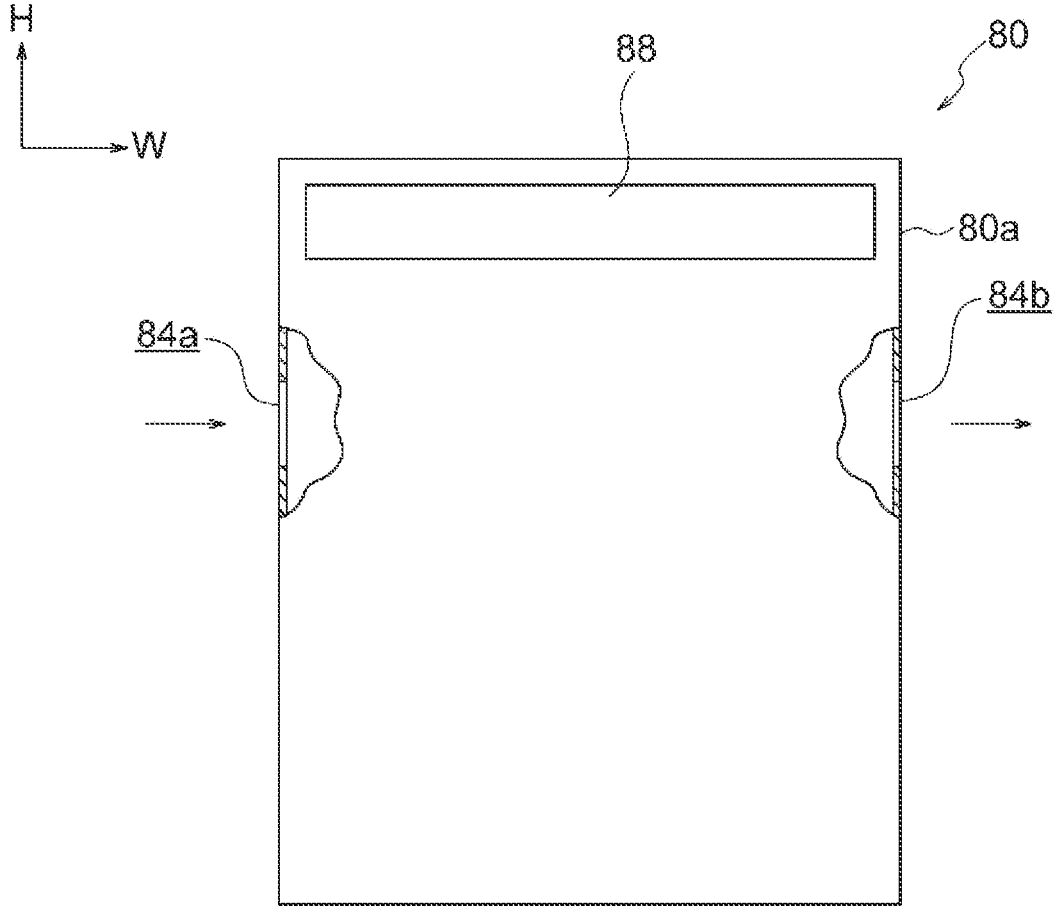
FIG. 7 is an external view illustrating an appearance of a cutting machine included in a medium processing system according to an exemplary embodiment of the present disclosure.

FIG. 7 schematically illustrates the cutting machine 80 as viewed from the operation side of the cutting machine 80. In other words, FIG. 7 schematically illustrates the cutting machine 80 as viewed from the side of the operation screen 88 of the cutting machine 80.

The cutting machine 80 is a known cutting machine and is configured to receive each sheet member P and perform predetermined cutting processing on the received sheet member P.

As illustrated in FIG. 7, a housing 80*a* of the cutting machine 80 has a reception port 84*a* through which each sheet member P is received, and a delivery port 84*b* through which each sheet member P subjected to the cutting processing is delivered. Specifically, when viewed from the operation side of the cutting machine 80, the reception port 84*a* is formed on the other side in the width direction, and the delivery port 84*b* is formed on the one side in the width direction. In other words, when viewed from the operation side of the cutting machine 80, the reception port 84*a* is formed on the left side, and the delivery port 84*b* is formed on the right side.

A height of the reception port 84*a* from a floor surface at which the cutting machine 80 is installed is similar to a height of the delivery port 11 of the image forming device 10. In addition, a height of the delivery port 84*b* from the floor surface at which the cutting machine 80 is installed is similar to a height of the delivery port 11 of the image forming device 10.

In this configuration, as illustrated in FIG. 7, when viewed from the operation side of the cutting machine 80, the cutting machine 80 receives each sheet member P from the other side in the width direction and delivers the sheet member P subjected to the cutting processing to the one side in the width direction. In other words, when viewed from the operation side of the cutting machine 80, the cutting machine 80 receives each sheet member P from the left side and delivers the sheet member P subjected to the cutting processing to the right side.

Bookbinding Machine 90

Figure 8:
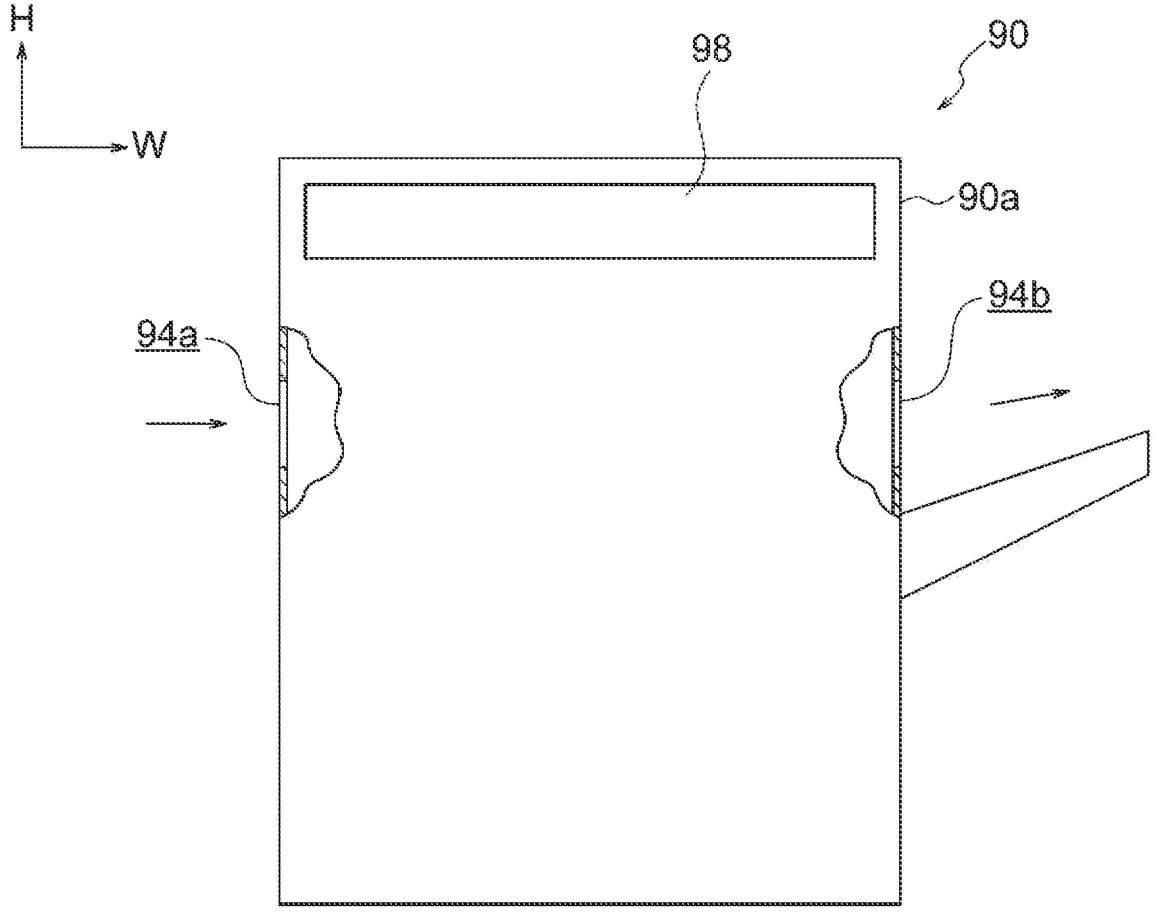
FIG. 8 is an external view illustrating an appearance of a bookbinding machine included in a medium processing system according to an exemplary embodiment of the present disclosure.

FIG. 8 schematically illustrates the bookbinding machine 90 as viewed from the operation side of the bookbinding machine 90. In other words, FIG. 8 schematically illustrates the bookbinding machine 90 as viewed from the side of the operation screen 98 of the bookbinding machine 90.

The bookbinding machine 90 is a known bookbinding machine, which is a machine that receives multiple sheet members P and binds the sheet members P into a book. In the present exemplary embodiment, the bookbinding machine 90 is configured to, every time when the bookbinding machine 90 receives a predetermined number of sheet members P, create a book by performing bookbinding processing on the multiple sheet members P.

As illustrated in FIG. 8, a housing 90*a* of the bookbinding machine 90 has a reception port 94*a* through which each sheet member P is received, and a delivery port 94*b* through which each created book is delivered. Specifically, when viewed from the operation side of the bookbinding machine 90, the reception port 94*a* is formed on the other side in the width direction, and the delivery port 94*b* is formed on the one side in the width direction. In other words, when viewed from the operation side of the bookbinding machine 90, the reception port 94*a* is formed on the left side, and the delivery port 94*b* is formed on the right side.

A height of the reception port 94*a* from a floor surface at which the bookbinding machine 90 is installed is similar to a height of the delivery port 11 of the image forming device 10.

In this configuration, as illustrated in FIG. 8, when viewed from the operation side of the bookbinding machine 90, the bookbinding machine 90 receives each sheet member P subjected to the cutting processing by the cutting machine 80 from the other side in the width direction, and delivers each created book to the one side in the width direction. In other words, when viewed from the operation side of the bookbinding machine 90, the bookbinding machine 90 receives each sheet member P from the left side and delivers each created book to the right side.

Intermediate Transport Device 70

Figure 9:
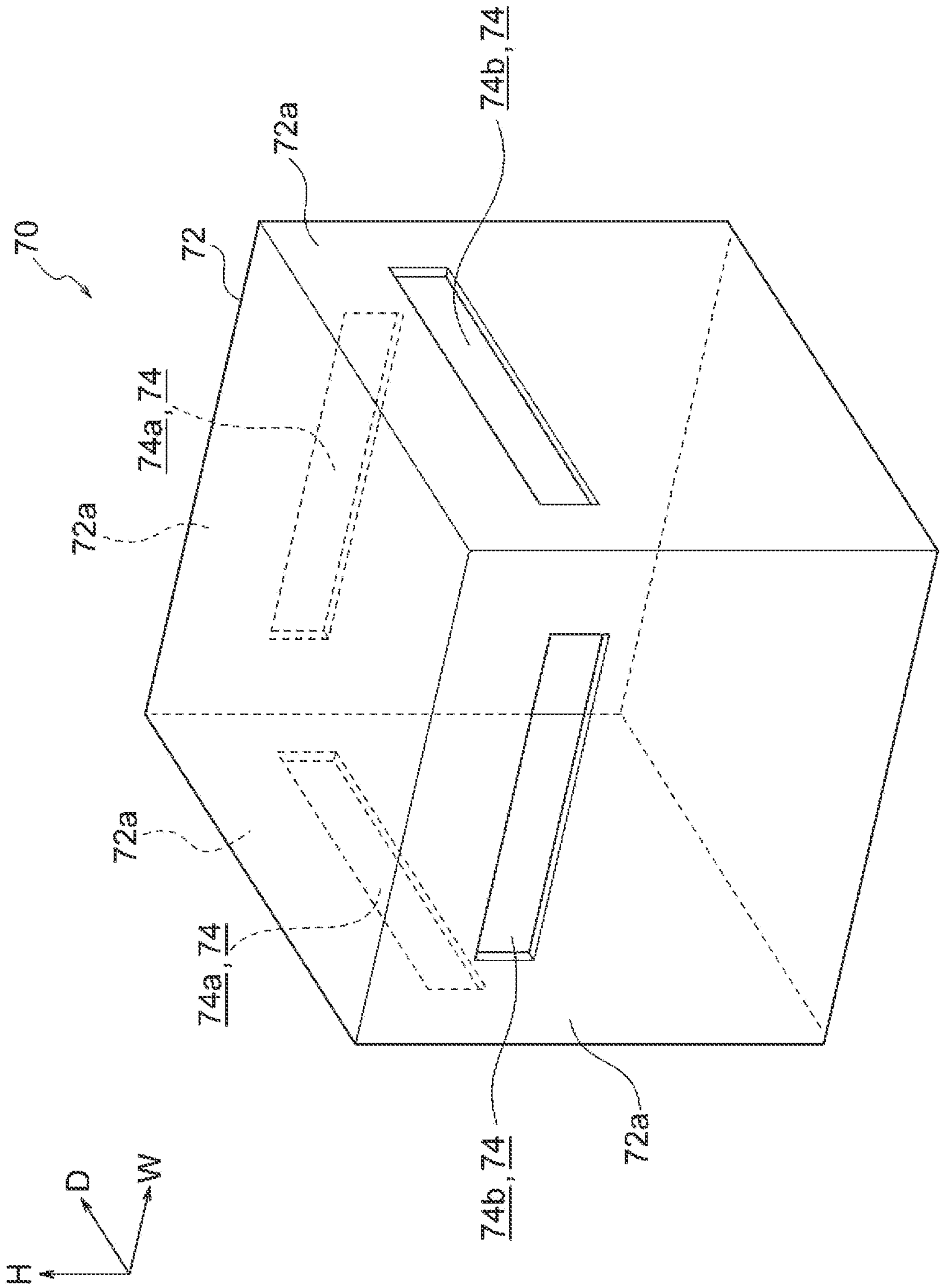
FIG. 9 is a perspective view illustrating an intermediate transport device according to an exemplary embodiment of the present disclosure.

As illustrated in FIG. 9, the intermediate transport device 70 includes a rectangular parallelepiped housing 72 having a quadrangular shape in a plan view, and the housing 72 includes four side walls 72*a* each having an opening 74. In the present exemplary embodiment, the opening 74 formed in the side wall 72*a* directed to the other side in the width direction and the opening 74 formed in the side wall 72*a* directed to the far side in the depth direction are reception ports 74*a* through which each sheet member P is received. The opening 74 formed in the side wall 72*a* directed to the one side in the width direction and the opening 74 formed in the side wall 72*a* directed to the near side in the depth direction are delivery ports 74*b* through which each sheet member P is delivered.

Heights of the openings 74 from a floor surface at which the intermediate transport device 70 is installed are similar to a height of the delivery port 11 of the image forming device 10 and a height of the delivery port 111 of the image forming device 110. In other words, a height of each opening 74 from the floor surface at which the intermediate transport device 70 is installed is similar to a height of the reception port 184*a* of the folding machine 180 and a height of the reception port 84*a* of the cutting machine 80.

In the present exemplary embodiment, "height of an opening or a port" denotes a height of a sheet member P in a state of passing through the opening or the port while being held between rollers and transported. In addition, "similar" denotes that one is within ±5% of the other while the other is within ±5% of the one.

Figure 10B:
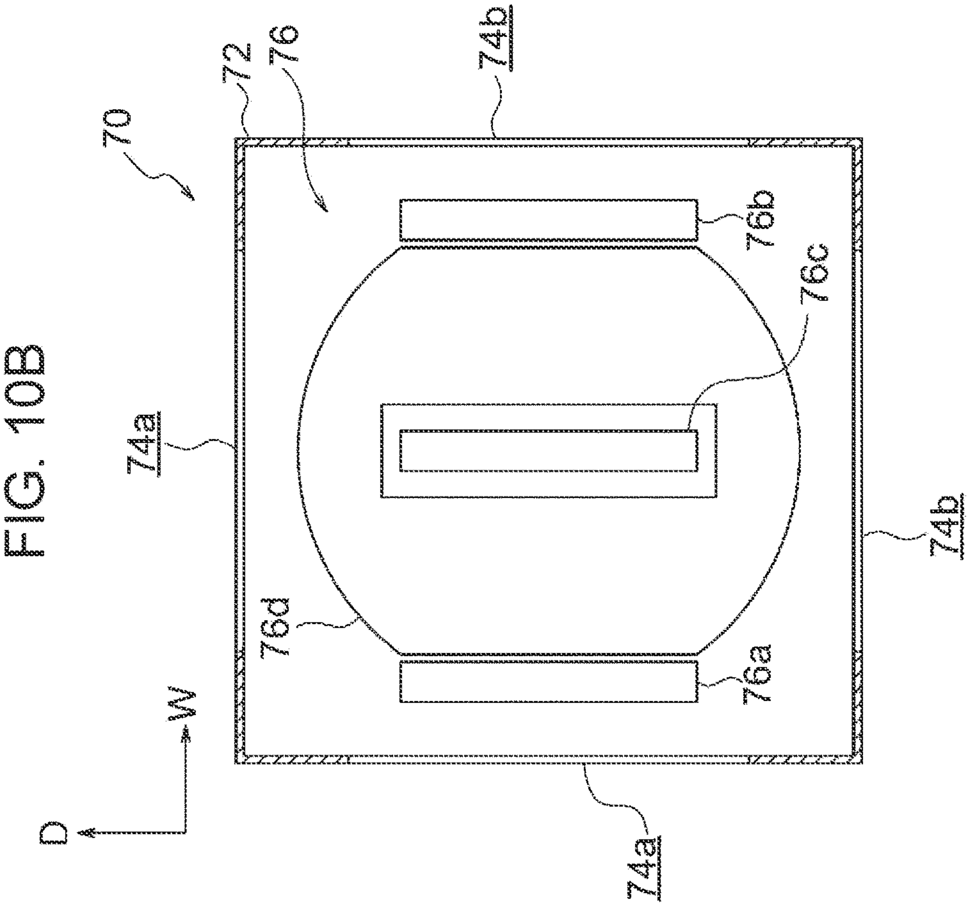
FIG. 10A and FIG. 10B are a side sectional view and a plan sectional view illustrating an intermediate transport device according to an exemplary embodiment of the present disclosure.
Figure 10A:
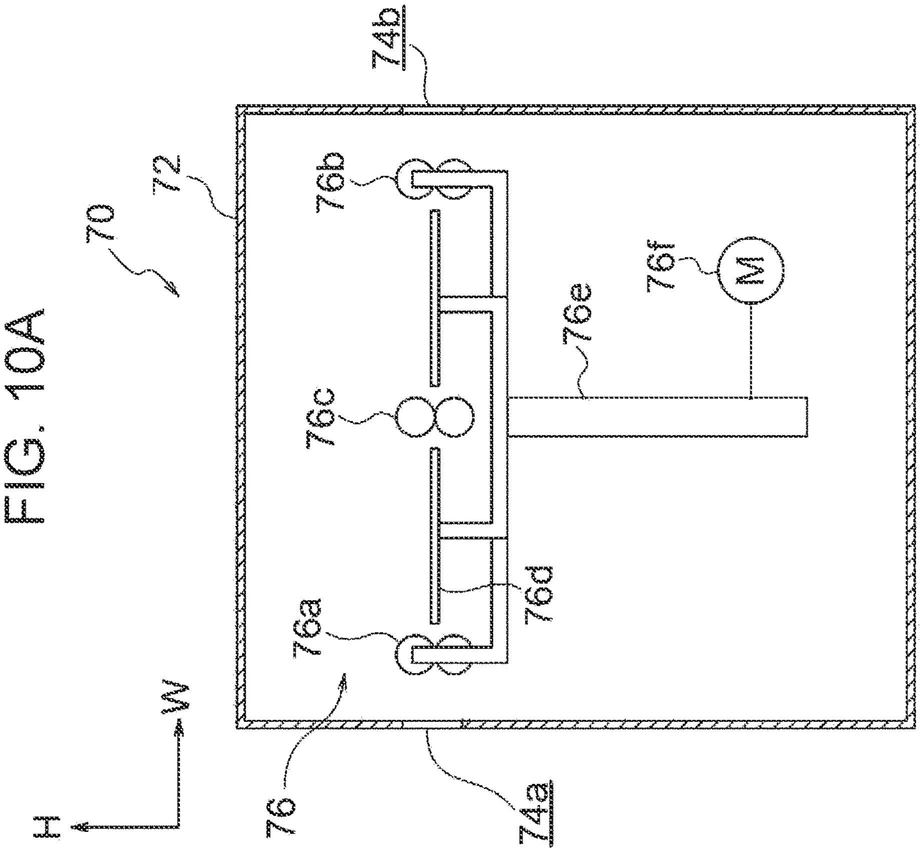

As illustrated in FIG. 10A and FIG. 10B, the intermediate transport device 70 includes, in the inside of the housing 72, a changing portion 76 capable of changing the delivery direction of each sheet member P. Here, "changing the delivery direction of each sheet member P" denotes changing a direction to which the leading edge of the sheet member P is directed and delivering the sheet member P from the leading edge of the sheet member P. The changing portion 76 is an example of a changing unit.

The changing portion 76 includes a reception roller 76*a* that receives sheet members P through the reception ports 74*a*; a delivery roller 76*b* that delivers each sheet member P to the outside through the delivery ports 74*b*; and an intermediate roller 76*c* that is disposed between the reception roller 76*a* and the delivery roller 76*b*. The changing portion 76 further includes a plate-shaped reception table 76*d* on which each received sheet member P is to be placed. To these rollers, a rotational force is to be transmitted from a driver, which is not illustrated.

A height of the reception roller 76*a*, a height of the delivery roller 76*b*, and a height of the intermediate roller 76*c* from a floor surface are similar to a height of each opening 74. A height of each roller denotes a height of a portion at which a sheet member P is held by the roller. In the reception table 76*d*, a height of a plate surface on which each sheet member P is to be placed is similar to a height of the reception roller 76*a*, a height of the delivery roller 76*b*, and a height of the intermediate roller 76*c*.

When viewed from above, the reception table 76*d* has a circular shape in which portions where the reception roller 76*a* and the delivery roller 76*b* are disposed are omitted, and the reception table 76*d* is disposed between the reception roller 76*a* and the delivery roller 76*b*. A through hole in which the intermediate roller 76*c* is disposed is formed at a central portion of the reception table 76*d*. The reception roller 76*a*, the delivery roller 76*b*, the intermediate roller 76*c*, and the reception table 76*d* are coupled to each other with brackets or the like (not illustrated) interposed therebetween so as to be rotatable integrally.

The changing portion 76 further includes a shaft 76*e* that supports the reception table 76*d* and serves as the rotational axis about which the reception table 76*d* and the like are rotated; and a driver 76*f* that rotates the shaft 76*e*. The axial direction of the shaft 76*e* is the up-down direction (vertical direction). The shaft 76*e* has an upper portion divided horizontally and is connected at an upper end of the divided portion to the rear surface of the reception table 76*d*. The reception roller 76*a*, the delivery roller 76*b*, the intermediate roller 76*c*, and the reception table 76*d* are configured to rotate about the center of the circular reception table 76*d* in response to the driver 76*f* rotating the shaft 76*e*.

Figure 11B:
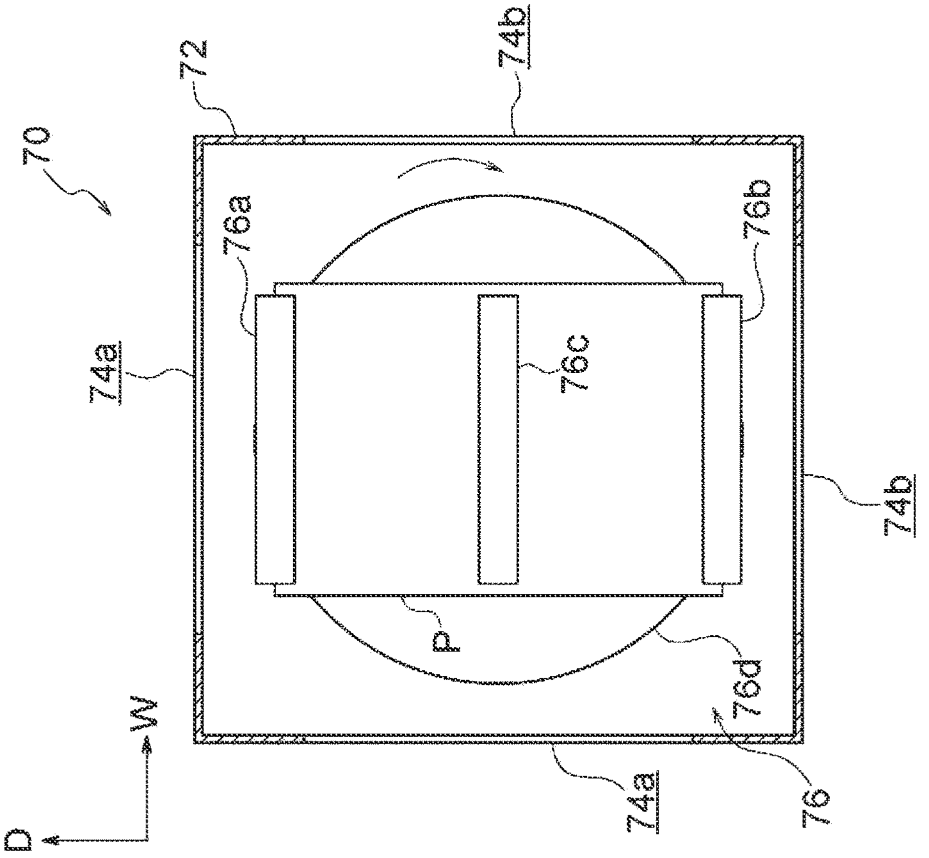
FIG. 11A and FIG. 11B illustrate operation of an intermediate transport device according to an exemplary embodiment of the present disclosure.
Figure 11A:
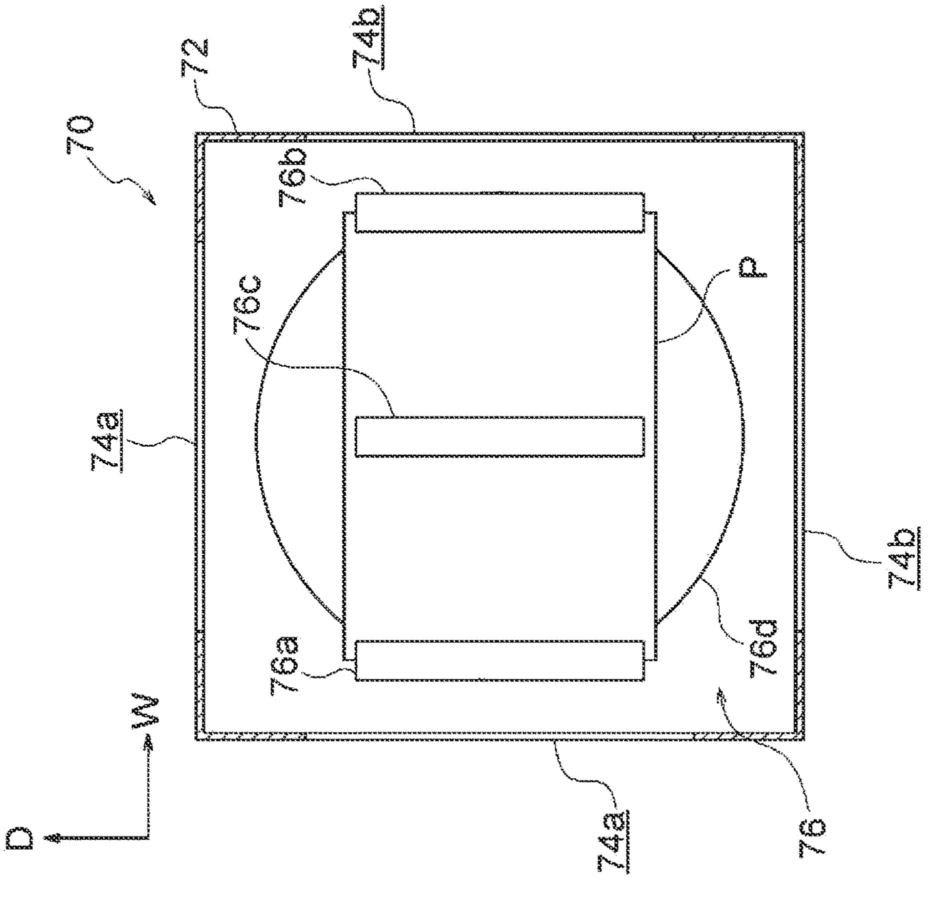

In this configuration, when a sheet member P received from the image forming device 10 is to be delivered to the folding machine 180 (refer to FIG. 1), as illustrated in FIG. 11A, the reception roller 76*a* receives the sheet member P through the reception port 74*a* on the other side in the width direction, and the reception roller 76*a* and the intermediate roller 76*c* transport the received sheet member P to a prescribed location on the reception table 76*d*. Specifically, a controller (not illustrated) receives information on the shape of the sheet member P and controls the number of rotations of each roller on the basis of timing of detection by a sensor that detects the leading end of the sheet member P. The sheet member P is thereby transported to a location where the center of the sheet member P overlaps the center of the circular reception table 76*d*. When the center of the sheet member P overlaps the center of the circular reception table 76*d*, each roller stops.

Then, the driver 76*f* illustrated in FIG. 10A rotates the shaft 76*e*. Specifically, in a state in which the center of the sheet member P overlaps the rotational axis, the driver 76*f* rotates the shaft 76*e*.

Consequently, as illustrated in FIG. 11B, the reception roller 76*a*, the delivery roller 76*b*, the intermediate roller 76*c*, and the reception table 76*d* rotate integrally. Thus, the changing portion 76 rotates sheet members P in a state in which heights of the sheet members P received through the reception ports 74*a* are maintained. Specifically, in a state in which a height of a sheet member P at a time when the sheet member P is received by the reception roller 76*a* is maintained, the reception roller 76*a*, the delivery roller 76*b*, and the intermediate roller 76*c* transport the sheet member P and rotate the sheet member P in a state in which this height is maintained.

Specifically, the reception roller 76*a*, the delivery roller 76*b*, the intermediate roller 76*c*, and the reception table 76*d* rotate clockwise by 90 degrees. Then, the controller (not illustrated) controls the driver 76*f*, and the reception table 76*d* stops in a state in which the delivery roller 76*b* and the delivery port 74*b* on the near side in the depth direction face each other. In this state, each roller rotates, and the delivery roller 76*b* delivers the sheet member P through the delivery port 74*b* to the folding machine 180 (refer to FIG. 1).

Meanwhile, when each sheet member P received from the image forming device 10 is to be delivered to the cutting machine 80 (refer to FIG. 1), as illustrated in FIG. 11A, the reception roller 76*a* receives the sheet member P through the reception port 74*a* on the other side in the width direction, and, without rotating clockwise or counterclockwise, the delivery roller 76*b* delivers the sheet member P through the delivery port 74*b* on the one side in the width direction to the folding machine 180 (refer to FIG. 1).

The reception roller 76*a*, the delivery roller 76*b*, the intermediate roller 76*c*, and the reception table 76*d* rotate clockwise by 90 degrees or counterclockwise by 90 degrees. Consequently, the intermediate transport device 70 can deliver each sheet member P to one side and the other side in an intersecting direction intersecting with a receiving direction in which the sheet member P is received.

Effects

Next, effects of the intermediate transport device 70 and the medium processing system 200 will be described. First, a case in which a pamphlet is created by three-folding a sheet member P on which a color image has been formed will be described, and, next, a case in which a book having a color page and a monochrome page is created will be described. The following effects are exerted as a result of the controller (not illustrated) controlling each portion.

Creation of Pamphlet

The image forming device 10 illustrated in FIG. 1 delivers a sheet member P on which a color image has been formed, through the delivery port 11 on the one side in the width direction.

Then, the intermediate transport device 70 receives the sheet member P delivered from the image forming device 10, through the reception port 74*a* on the other side in the width direction. The intermediate transport device 70 is in a state in which the reception roller 76*a* faces the reception port 74*a* on the other side in the width direction.

Specifically, as illustrated in FIG. 11A, the reception roller 76*a* of the intermediate transport device 70 receives the sheet member P through the reception port 74*a*, and the reception roller 76*a*, the intermediate roller 76*c*, and the delivery roller 76b transport the received sheet member P to a prescribed location on the reception table 76d. In response to the driver 76f illustrated in FIG. 10A rotating the shaft 76e, the reception roller 76a, the delivery roller 76b, the intermediate roller 76c, and the reception table 76d rotate clockwise integrally as illustrated in FIG. 11B.

Then, in a state in which the delivery roller 76b and the delivery port 74b on the near side in the depth direction face each other, the reception table 76d stops. In this state, each roller rotates, and the delivery roller 76b delivers the sheet member P through the delivery port 74b to the folding machine 180 (refer to FIG. 1) on the near side in the depth direction. When the sheet member P has been delivered to the folding machine 180, the reception roller 76a, the delivery roller 76b, the intermediate roller 76c, and the reception table 76d rotate counterclockwise integrally, and the reception roller 76a faces the reception port 74a on the other side in the width direction.

The folding machine 180 receives the sheet member P through the reception port 184a illustrated in FIG. 6 on the far side in the depth direction and delivers, as a pamphlet, the sheet member P subjected to folding processing to be three-folded, through the delivery port 184b on the near side in the depth direction.

By repeating the above processing, the medium processing system 200 creates multiple pamphlets.

Creation of Book

For example, when a book in which the first and last pages are color pages while the other pages are monochrome pages is to be created, the image forming device 10 illustrated in FIG. 1 delivers each sheet member P on which a color image is formed, through the delivery port 11 on the one side in the width direction.

Then, the intermediate transport device 70 receives each sheet member P delivered from the image forming device 10, through the reception port 74a on the other side in the width direction. The intermediate transport device 70 is in a state in which the reception roller 76a faces the reception port 74a on the other side in the width direction.

Specifically, as illustrated in FIG. 11A, the reception roller 76a of the intermediate transport device 70 receives each sheet member P through the reception port 74a. Then, the reception roller 76a, the intermediate roller 76c, and the delivery roller 76b transport each received sheet member P being placed on the reception table 76d and delivers the sheet member P through the delivery port 74b on the one side in the width direction. When the sheet member P has been delivered to the cutting machine 80, the reception roller 76a, the delivery roller 76b, the intermediate roller 76c, and the reception table 76d rotate clockwise integrally and stop when the reception roller 76a faces the reception port 74a on the far side in the depth direction.

The cutting machine 80 receives each sheet member P through the reception port 84a illustrated in FIG. 7 on the other side in the width direction and delivers the sheet member P subjected to cutting processing, through the delivery port 84b on the one side in the width direction.

Then, the bookbinding machine 90 receives each sheet member P through the reception port 94a illustrated in FIG. 8 on the other side in the width direction and receives the sheet member P into the inside of the housing 90a of the bookbinding machine 90.

The image forming device 110 delivers each sheet member P on which a monochrome image has been formed, through the delivery port 111 illustrated in FIG. 4 on the near side in the depth direction.

Then, the intermediate transport device 70 receives the sheet member P delivered from the image forming device 110, through the reception port 74a on the far side in the depth direction.

Figure 12B:
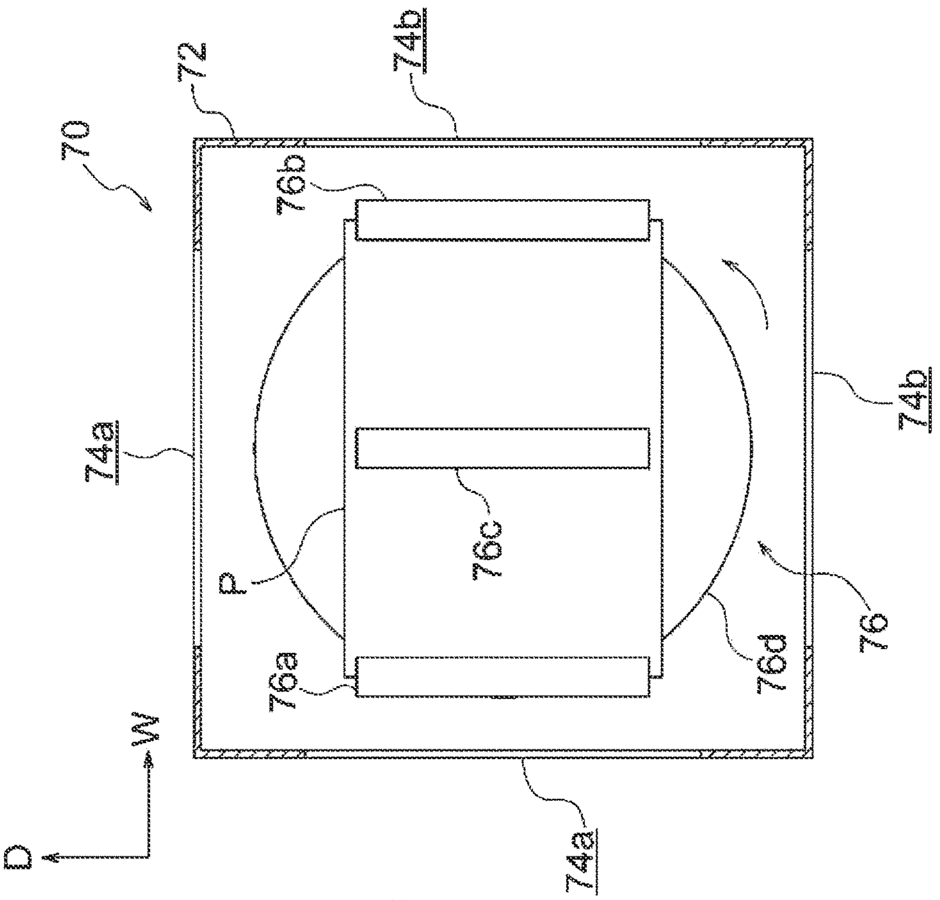
FIG. 12A and FIG. 12B illustrate operation of an intermediate transport device according to an exemplary embodiment of the present disclosure.
Figure 12A:
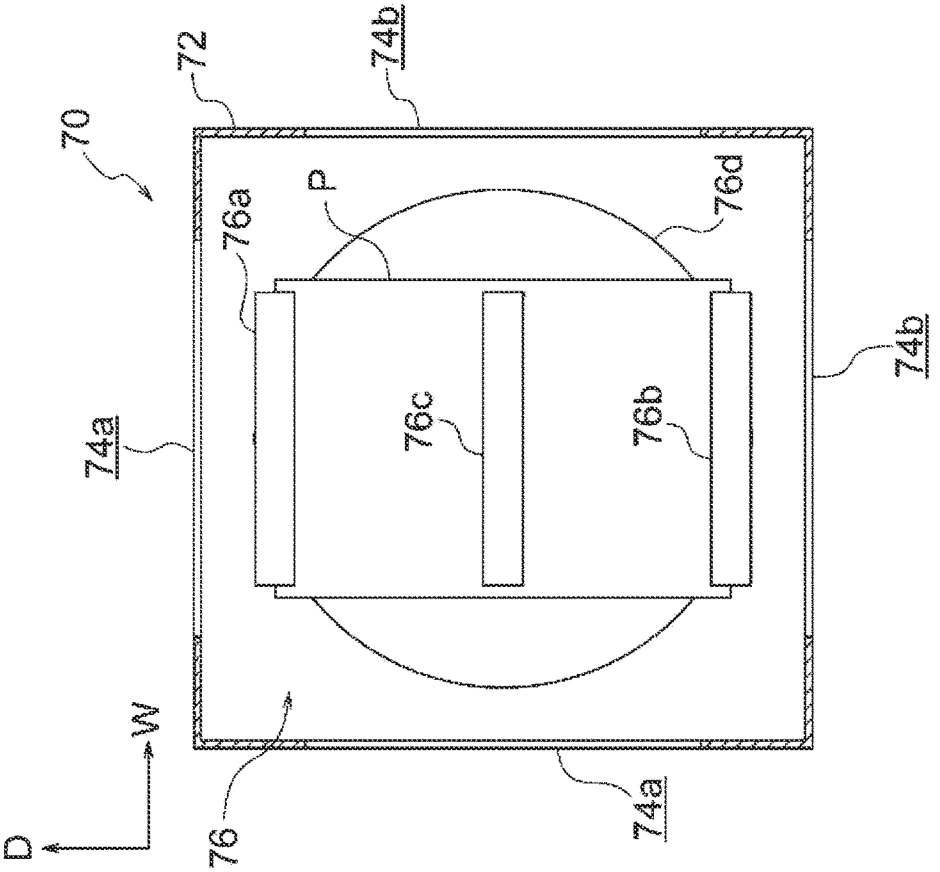

Specifically, as illustrated in FIG. 12A, the reception roller 76a of the intermediate transport device 70 receives the sheet member P through the reception port 74a, and the reception roller 76a, the intermediate roller 76c, and the delivery roller 76b transport the received sheet member P to a prescribed location on the reception table 76d. In response to the driver 76f illustrated in FIG. 10A rotating the shaft 76e, the reception roller 76a, the delivery roller 76b, the intermediate roller 76c, and the reception table 76d rotate counterclockwise integrally as illustrated in FIG. 12B.

Then, the reception table 76d stops in a state in which the delivery roller 76b and the delivery port 74b on the one side in the width direction face each other. In this state, each roller rotates, and the delivery roller 76b delivers the sheet member P through the delivery port 74b to the cutting machine 80 on the one side in the width direction. When the sheet member P has been delivered to the cutting machine 80, the reception roller 76a, the delivery roller 76b, the intermediate roller 76c, and the reception table 76d rotate clockwise integrally and stop when the reception roller 76a faces the reception port 74a on the far side in the depth direction.

The cutting machine 80 receives the sheet member P through the reception port 84a illustrated in FIG. 7 on the other side in the width direction and delivers the sheet member P subjected to cutting processing, through the delivery port 84b on the one side in the width direction.

Then, the bookbinding machine 90 receives the sheet member P through the reception port 94a illustrated in FIG. 8 on the other side in the width direction and receives the sheet member P into the inside of the housing 90a of the bookbinding machine 90.

Next, a pair of the sheet members P of color images formed by the image forming device 10 are stacked in the inside of the housing 90a such that multiple sheet members P of monochrome images formed by the image forming device 110 are held between the pair of sheet members P of color images. Then, the bookbinding machine 90 creates a book by performing bookbinding processing on the multiple number of the sheet members P and delivers the created book through the delivery port 94b on the one side in the width direction.

By repeating the above processing, the medium processing system 200 creates multiple books.

Overview

As described above, in the intermediate transport device 70, a height of the delivery port 74b through which delivery from the intermediate transport device 70 to the cutting machine 80 as a post-processing device is performed is similar to a height of the delivery port 74b through which delivery from the intermediate transport device 70 to the folding machine 180 as a post-processing device is performed. Consequently, in a configuration in which each sheet member P is delivered to multiple post-processing devices with the direction of the sheet member P changed, management of height adjustment of the post-processing devices may be simplified, compared with a case where a height of the delivery port through which each sheet member P passes when the sheet member P is to be delivered to the folding machine differs from a height of the delivery port through which each sheet member P passes when the sheet member P is to be delivered to the cutting machine.

In addition, in the intermediate transport device 70, height of the reception ports 74*a* are similar to a height of the delivery ports 74*b*. Consequently, management of height adjustment of the image forming devices 10 and 110 as pre-processing devices and management of height adjustment of the folding machine 180 and the cutting machine 80 as post-processing devices may be simplified, compared with a case where height of the reception ports differ from a height of the delivery ports.

In addition, in the intermediate transport device 70, the changing portion 76 changes the delivery direction of each sheet member P by rotating the sheet member P with the vertical direction being a rotational axis direction. Consequently, jamming of transported sheet members P due to winding failure caused by a difference in the stiffness of the sheet members P may be suppressed, compared with a case where, to change delivery directions, the sheet members P are each transported in a spiral form while being wound around an inclined roller inclined with respect to a receiving direction in which each sheet member P is received.

In addition, the intermediate transport device 70 receives each sheet member P, rotates the sheet member P in a state in which a height of the received sheet member P is maintained, and delivers the sheet member P. Therefore, deformation of each sheet member P caused by a change in height may be suppressed, compared with a case where height of received sheet members P vary.

In addition, in the intermediate transport device 70, a height of the reception roller 76*a* is similar to a height of the delivery roller 76*b*. Consequently, deformation of each sheet member P caused when the sheet member P is transported from the reception roller 76*a* to the delivery roller 76*b* may be suppressed, compared with a case where a height of the reception roller 76*a* differs from a height of the delivery roller 76*b*.

In addition, in the intermediate transport device 70, a height of the intermediate roller 76*c* disposed between the reception roller 76*a* and the delivery roller 76*b* is similar to heights of the reception roller 76*a* and the delivery roller 76*b*. Consequently, deformation of each sheet member P caused when the sheet member P is transported by the reception roller 76*a*, the intermediate roller 76*c*, and the delivery roller 76*b* may be suppressed, compared with a case where a height of the intermediate roller differs from heights of the reception roller and the delivery roller.

In addition, as described above, in the intermediate transport device 70, the changing portion 76 delivers, without changing the transport direction, each sheet member P received through the reception port 74*a* that faces the image forming device 10, through the delivery port 74*b* that faces the cutting machine 80. Meanwhile, the changing portion 76 delivers, with the delivery direction changed, each sheet member P received through the reception port 74*a* that faces the image forming device 110, through the delivery port 74*b* that faces the cutting machine 80. As described above, each sheet member P received directly from the image forming device 10 and each sheet member P received directly from the image forming device 110 are delivered to the cutting machine 80.

In addition, in the intermediate transport device 70, a height of the reception port 74*a* through which each sheet member P received from the image forming device 10 passes is similar to a height of the reception port 74*a* through which each sheet member P received from the image forming device 110 passes. Consequently, management of height adjustment of the pre-processing devices may be simplified, compared with a case where heights of multiple reception ports differ from each other.

In addition, in the intermediate transport device 70, the changing portion 76 changes delivery directions by rotating, with the axial direction being in the vertical direction, sheet members P each received through a corresponding one of the multiple reception ports 74*a*. Consequently, jamming of transported sheet members P due to winding failure caused by a difference in the stiffness of the sheet members P may be suppressed, compared with a case where, to change delivery directions, the sheet members P received through the reception ports are each transported in a spiral form while being wound around an inclined roller inclined with respect to a receiving direction.

In addition, the intermediate transport device 70 is provided with the multiple delivery ports 74*b*, and heights of the multiple delivery ports 74*b* are similar to each other. Consequently, management of height adjustment of the post-processing devices may be simplified, compared with a case where heights of the delivery ports through which sheet members P pass when the sheet members P are to be delivered to the post-processing devices differ from each other.

In addition, in the intermediate transport device 70, heights of the multiple reception ports 74*a* are similar to each other, and heights of the delivery ports 74*b* are similar to heights of the reception ports 74*a*. Consequently, management of height adjustment of the pre-processing devices and management of height adjustment of the post-processing devices may be simplified, compared with a case where heights of the reception ports and heights of the delivery ports differ from each other.

In addition, in the medium processing system 200, a time required for replacement in which one post-processing device facing one delivery port and another post-processing device facing another delivery port are replaced with each other may be reduced, compared with a case where an intermediate transport device in which heights of delivery ports are different is included.

In addition, in the medium processing system 200, multiple types of sheet members P may be processed in one line by receiving the sheet members P directly from the multiple pre-processing devices, compared with a case where an intermediate transport device having only one reception port through which sheet members P are directly received from the pre-processing devices is included.

In addition, in the medium processing system 200, the image forming devices 10 and 110 are used as the pre-processing devices. Consequently, images to be formed on the sheet members P that are to be delivered to the intermediate transport device 70 may be easily changed.

Although specific exemplary embodiments of the present disclosure have been described in detail, the present disclosure is not limited to the exemplary embodiments. It is obvious for a person skilled in the art that the present disclosure can be embodied as various exemplary embodiments within the scope of the present disclosure. For example, although the image forming devices 10 and 110 are described as examples of the pre-processing device in the aforementioned exemplary embodiments, the pre-processing device may be a pre-processing stacker machine in which printed sheet members P are stacked, an inkjet image forming device, or the like. In this case, an effect that is exerted by using the image forming device as the pre-processing device is not exerted.

In addition, although the folding machine 180, the cutting machine 80, and the bookbinding machine 90 are described as examples of the post-processing device in the aforementioned exemplary embodiments, the post-processing device may be a saddle stitching machine, a binding machine, a stacker machine, a stapling machine, a slitting machine, a pressing machine, a post-processing stacker machine, or the like.

In addition, in the aforementioned exemplary embodiments, the intermediate transport device 70 has a quadrangular shape in a plan view and has side surfaces each provided with a reception port or a delivery port. However, the intermediate transport device 70 may have another polygonal shape such as a triangular shape, a pentagonal shape, or a hexagonal shape in a plan view and have side surfaces each provided with a reception port or a delivery port.

In addition, although not particularly described in the aforementioned exemplary embodiments, a static eliminator device that neutralizes static charge on each sheet member P, an inspection device that inspects each image, a buffer device that stores each sheet member P temporarily and delivers the sheet member P to a device of a later stage, and the like may be provided between the image forming device and the intermediate transport device. In such a case, multiple devices that are disposed on the upstream side with respect to the intermediate transport device in a processing direction of each sheet member P serve as one pre-processing device.

In addition, although the delivery direction of each sheet member P is changed by rotating the sheet member P received by the intermediate transport device 70 in the aforementioned exemplary embodiment, the delivery direction of each sheet member P may be changed by winding the sheet member P around an inclined roller that is inclined with respect to a receiving direction and transporting the sheet member P in a spiral form. In this case, however, an effect that is exerted as a result of changing the delivery direction of each sheet member P by rotating the sheet member P is not exerted.

In addition, although the transport direction of each sheet member P is changed by rotating the sheet member P in a state in which the orientation of the sheet member P received by the intermediate transport device 70 is maintained in the aforementioned exemplary embodiment, the delivery direction of each sheet member P may be changed by winding the sheet member P around an inclined roller that is inclined with respect to a receiving direction of the sheet member P and transporting the sheet member P in a spiral form. In this case, however, an effect that is exerted as a result of changing the transport direction of each sheet member P by rotating the sheet member P in a state in which the orientation of the sheet member P is maintained is not exerted.

In addition, although not particularly described in the aforementioned exemplary embodiment, when the delivery direction of each sheet member P is changed by winding the sheet member P around an inclined roller inclined with respect to a receiving direction and transporting the sheet member P in a spiral shape, multiple inclined rollers may be used to cause heights of multiple delivery ports to be similar to each other.

In addition, although the changing portion 76 rotates each sheet member P in a state in which the center of the sheet member P overlaps the rotational axis in the aforementioned exemplary embodiment, the changing portion 76 may rotate each sheet member P in a state in which the center does not overlap the rotational axis. In this case, however, an effect that is exerted as a result of rotating each sheet member P in a state in which the center of the sheet member P overlaps the rotational axis is not exerted.

In addition, although heights of the reception roller **76*a*, the delivery roller 76*b*, and the intermediate roller 76*c*** are similar to each other in the aforementioned exemplary embodiment, the heights may differ from each other. In this case, however, an effect that is exerted as a result of the heights being similar to each other is not exerted.

In addition, although heights of the reception ports **74*a* and heights of the delivery ports 74*b*** are similar to each other in the aforementioned exemplary embodiment, the heights may differ from each other. In this case, however, an effect that is exerted as a result of the heights being similar to each other is not exerted.

In addition, although not particularly described in the aforementioned exemplary embodiment, for example, when the cutting machine 80 as the one post-processing device and the folding machine 180 as the other post-processing device are replaced with each other, the folding machine is the one post-processing device while the cutting machine is the other post-processing device.

In addition, although not particularly described in the aforementioned exemplary embodiment, the medium processing system 200 includes a connecting member that connects the intermediate transport device 70 to the image forming devices 10 and 110, a member that connects the intermediate transport device 70 to the cutting machine 80, and a member that connects the intermediate transport device 70 to the folding machine 180.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An intermediate transport device comprising:

a changing unit that changes a direction of a recording medium received from a pre-processing device to at least one of one direction and another direction with respect to a receiving direction in which the recording medium is received, and delivers the recording medium; and a housing that has a delivery port through which the recording medium delivered to the one direction toward one post-processing device passes, and another delivery port through which the recording medium delivered to the other direction toward another post-processing device passes, and that is disposed at a height similar to a height of the delivery port.

(((2)))

The intermediate transport device according to (((1))), wherein the housing has a reception port through which the recording medium passes when the changing unit receives the recording medium from the pre-processing device, and wherein a height of the reception port is similar to the height of the delivery port.

(((3)))

The intermediate transport device according to (((1))), wherein the changing unit changes a delivery direction of the recording medium by rotating the recording medium with a vertical direction being an axial direction.

(((4)))

The intermediate transport device according to (((3))), wherein the changing unit rotates the recording medium in a state in which a height of the recording medium that is received is maintained.

(((5)))

The intermediate transport device according to any one of (((1))) to (((4))), wherein the changing unit includes:

a reception roller that receives the recording medium; and a delivery roller that is disposed at a height similar to a height of the reception roller and that delivers the recording medium through the delivery port.

(((6)))

The intermediate transport device according to any one of (((1))) to (((4))), wherein the changing unit includes:

a reception roller that receives the recording medium;

a delivery roller that is disposed at a height similar to a height of the reception roller and that delivers the recording medium through the delivery port; and an intermediate roller that is disposed between the reception roller and the delivery roller in a transport direction of the recording medium and that is disposed at a height similar to the height of the reception roller and the height of the delivery roller.

(((7)))

A medium processing system comprising:

a pre-processing device; and the intermediate transport device according to any one of (((1))) to (((6))), the intermediate transport device being configured to receive the recording medium from the pre-processing device and deliver the recording medium to a post-processing device.

(((8)))

The medium processing system according to (((7))), wherein the pre-processing device is an image forming device that forms an image on the recording medium.

(((2-1)))

An intermediate transport device comprising:

a housing that has a plurality of reception ports through each of which a recording medium is received from a corresponding one of a plurality of pre-processing devices, and a delivery port through which the recording medium is delivered to a post-processing device; and a changing unit that delivers the recording medium received through the corresponding one of the reception ports, through the delivery port that is common.

(((2-2)))

The intermediate transport device according to (((2-1))), wherein the plurality of reception ports are disposed at heights similar to each other.

(((2-3)))

The intermediate transport device according to (((2-2))), wherein the changing unit rotates the recording medium received through at least one of the reception ports with a vertical direction being an axial direction to change a delivery direction of the recording medium.

(((2-4)))

The intermediate transport device according to any one of (((2-1))) to (((2-3))), wherein a plurality of the delivery ports are provided, and the plurality of the delivery ports are disposed at heights similar to each other.

(((2-5)))

The intermediate transport device according to (((2-4))), wherein the plurality of reception ports are disposed at heights similar to each other, and wherein the delivery ports are disposed at heights similar to the heights of the reception ports.

(((2-6)))

A medium processing system comprising:

a pre-processing device; and the intermediate transport device according to any one of (((2-1))) to (((2-5))), the intermediate transport device being configured to receive the recording medium processed by the pre-processing device and deliver the recording medium to the post-processing device.

(((2-7)))

The medium processing system according to (((2-6))), wherein the pre-processing device is an image forming device that forms an image on the recording medium.

What is claimed is:

1. An intermediate transport device comprising:

a changing unit that changes a direction of a recording medium received from a pre-processing device to at least one of a first direction and a second direction with respect to a receiving direction in which the recording medium is received, and delivers the recording medium; and a housing that has a delivery port through which the recording medium is delivered to the first direction toward one post-processing device passes, and another delivery port through which the recording medium is delivered to the second direction toward another post-processing device passes, wherein a height of the delivery port for the first direction is the same as the height of the delivery port for the second direction.

2. The intermediate transport device according to claim 1, wherein the housing has a reception port through which the recording medium passes when the changing unit receives the recording medium from the pre-processing device, and wherein a height of the reception port is the same as the height of the delivery port.

3. A medium processing system comprising:

a pre-processing device; and the intermediate transport device according to claim 2, the intermediate transport device being configured to receive the recording medium from the pre-processing device and deliver the recording medium to a post-processing device.

4. The intermediate transport device according to claim 1, wherein the changing unit changes a delivery direction of the recording medium by rotating the recording medium with a vertical direction being an axial direction.

5. The intermediate transport device according to claim 4, wherein the changing unit rotates the recording medium in a state in which a height of the recording medium that is received is maintained.

6. A medium processing system comprising:
a pre-processing device; and
the intermediate transport device according to claim 5, the intermediate transport device being configured to receive the recording medium from the pre-processing device and deliver the recording medium to a post-processing device.

7. A medium processing system comprising:
a pre-processing device; and
the intermediate transport device according to claim 4, the intermediate transport device being configured to receive the recording medium from the pre-processing device and deliver the recording medium to a post-processing device.

8. The intermediate transport device according to claim 1, wherein the changing unit includes:
a reception roller that receives the recording medium; and
a delivery roller that is disposed at a height that is the same as the height of the reception roller and that delivers the recording medium through the delivery port.

9. A medium processing system comprising:
a pre-processing device; and
the intermediate transport device according to claim 8, the intermediate transport device being configured to receive the recording medium from the pre-processing device and deliver the recording medium to a post-processing device.

10. The intermediate transport device according to claim 1,
wherein the changing unit includes:
a reception roller that receives the recording medium;
a delivery roller that is disposed at a height that is the same as the height of the reception roller and that delivers the recording medium through the delivery port; and
an intermediate roller that is disposed between the reception roller and the delivery roller in a transport direction of the recording medium and that is disposed at the same height as the height of the reception roller and the height of the delivery roller.

11. A medium processing system comprising:
a pre-processing device; and
the intermediate transport device according to claim 6, the intermediate transport device being configured to receive the recording medium from the pre-processing device and deliver the recording medium to a post-processing device.

12. A medium processing system comprising:
a pre-processing device; and
the intermediate transport device according to claim 1, the intermediate transport device being configured to receive the recording medium from the pre-processing device and deliver the recording medium to a post-processing device.

13. The medium processing system according to claim 12, wherein the pre-processing device is an image forming device that forms an image on the recording medium.

14. An intermediate transport device comprising:
a housing that has a plurality of reception ports through each of which a recording medium is received from a corresponding one of a plurality of pre-processing devices, and a delivery port through which the recording medium is delivered to a post-processing device; and
a changing unit that delivers the recording medium received through the corresponding one of the reception ports, through the delivery port.

15. The intermediate transport device according to claim 14,
wherein the plurality of reception ports are disposed at the same height.

16. The intermediate transport device according to claim 15,
wherein the changing unit rotates the recording medium received through at least one of the reception ports with a vertical direction being an axial direction to change a delivery direction of the recording medium.

17. The intermediate transport device according to claim 14,
wherein a plurality of the delivery ports are provided, and the plurality of the delivery ports are disposed at the same height.

18. The intermediate transport device according to claim 17,
wherein the plurality of reception ports are disposed at the same height, and
wherein the delivery ports are disposed at the same height as the height of the reception ports.

19. A medium processing system comprising:
a pre-processing device; and
the intermediate transport device according to claim 14, the intermediate transport device being configured to receive the recording medium processed by the pre-processing device and deliver the recording medium to the post-processing device.

20. The medium processing system according to claim 19, wherein the pre-processing device is an image forming device that forms an image on the recording medium.

* * * * *